United States Patent Office 3,483,555
Patented Dec. 9, 1969

3,483,555
MULTIPLE MONITORING SYSTEM
Claude Auguste Birard, Saint-Germain-en-Laye, and
Gerard Cottrez, Rueil-Malmaison, France, assignors to La Telemecanique Electrique Societe Anonyme, Nanterre, France
Filed May 2, 1966, Ser. No. 547,022
Claims priority, application France, May 6, 1965, 16,008
Int. Cl. G08b *19/00;* H04q *3/00*
U.S. Cl. 340—413
5 Claims

ABSTRACT OF THE DISCLOSURE

The invention broadly relates to systems for sequentially monitoring a plurality of variable quantities, for instance temperatures, by translating the variations of said quantities under the form of resistance variations and sequentially measuring the latter variation by means of a bridge, the error signals being applied to respective control units.

The instant invention more particularly provides a system which is adapted for accurately monitoring a large number of variable quantities, said system including specific selector switch and gating means which are controlled by pulses generated at regular intervals successively on the respective outputs of a single timing generator.

---

The present invention relates to systems for sequentially controlling or monitoring a plurality of variable quantities which are to be regulated and the variations of which are translated under the form of an electrical resistance or voltage variation. In such systems, the resistance or voltage variations at the various control points are measured by means of a measurement device generally including a bridge, and amplifier arrangement, and the resulting error signals are applied to control units, one for each channel, which perform the proper correction on the various quantities so as to cancel, the error signals. In view of utilizing a single measurement unit, the various input channels (i.e., for instance, the various resistance detectors) are sequentially connected to the measurement unit through a selector switch during each of a plurality of successive control cycles and the respective error signals corresponding to the respective channels which successively appear at the output of the measurement unit are gated to the respective control units by means of a gating arrangement and in synchronism with the scanning of the respective control points.

It is an object of this present invention to provide a multiple monitoring system which is adapted for accurately controlling a large number of variable quantities and, therefore, has a high speed of scanning yet being comparatively simple in design and secure in operation.

It is another object of this invention to provide a selector switch which does not introduce any substantial error in the measurement and avoids any excessive non linearity in the operation of the monitoring system.

A more specific object of this invention is to provide, in a multiple monitoring system of the type specified, a selector switch and a gating arrangement which are both controlled by pulses generated at regular intervals successively on the respective outputs of a single timing generator.

Another object of this invention is to provide a timing generator for the control of the selector switch and gating arrangement, which is adapted for providing pulses successively on a large number of separate outputs, yet being comparatively simple in construction.

Still another object of this invention is to provide a gating arrangement including a feedback loop which regenerates the triggering pulses so as to maintain the control unit in operation during a complete control cycle, and logical circuit means for triggering-out the control unit of each channel through the use of the triggering pulse from the preceding channel, as soon as the error signal has been cancelled out in the first mentioned channel.

These and other objects and advantages of the invention will become more clearly apparent from the following description.

In the appended drawings:

FIGURE 1 is a block diagram of a regulator device according to a preferred embodiment of the invention;

FIGURE 2 diagrammatically shows a first embodiment of a multiple measuring unit which is adapted for use in the regulator of FIGURE 1;

Figure 1:
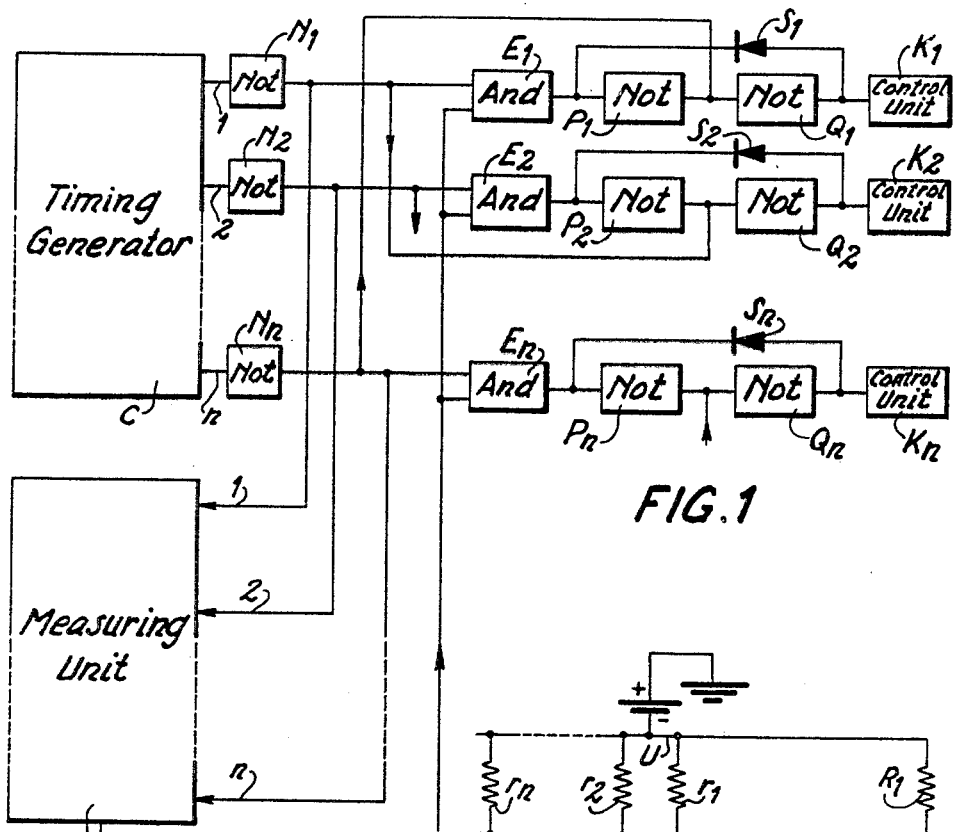
Figure 2:
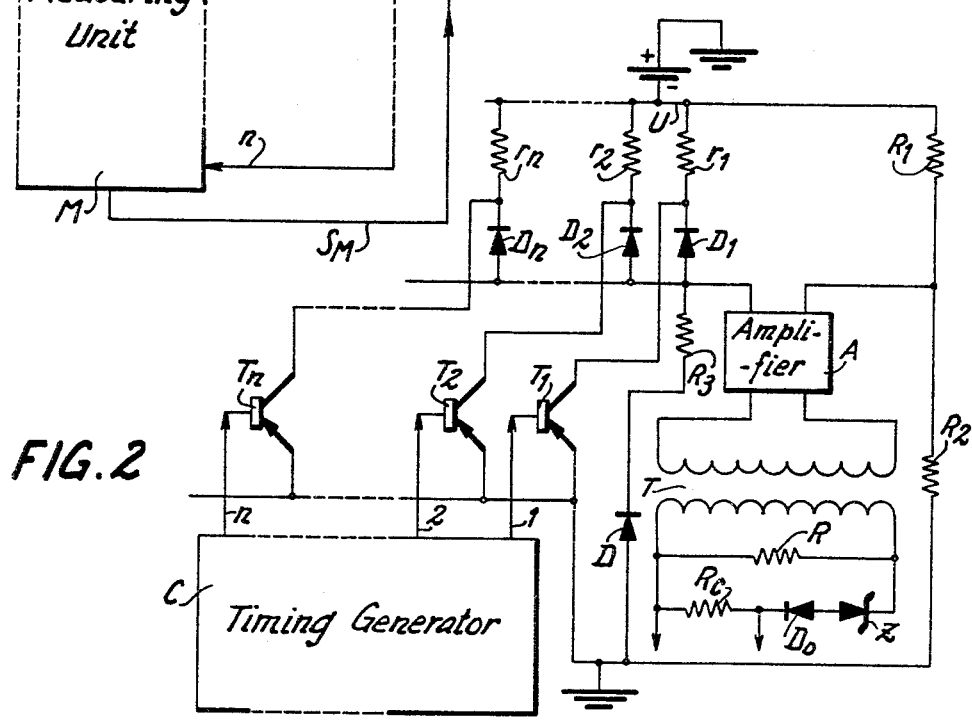
Figure 3:
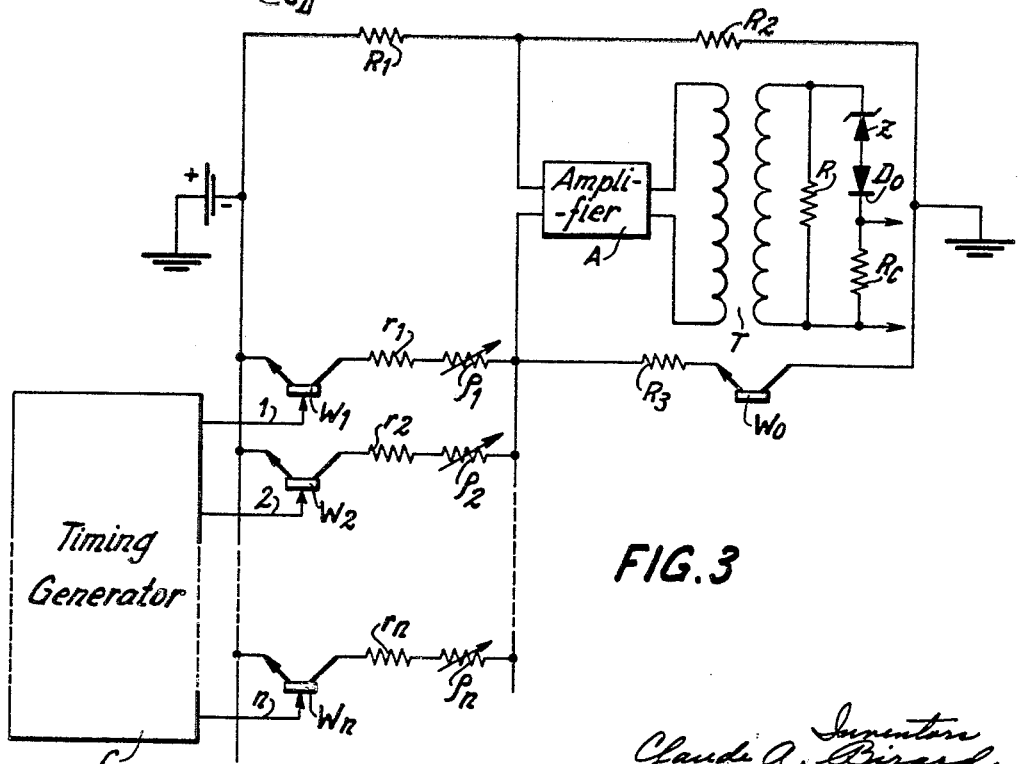
FIGURE 3 illustrates a second embodiment of the multiple measuring unit.

Referring more particularly now to FIGURE 1, the multiple measuring unit, which will be of the type disclosed in FIGURE 2 or, preferably, FIGURE 3, has been diagrammatically illustrated as a rectangle M. This unit as will be explained in more detail hereinafter is adapted for providing an error signal on its single output $S_M$ each time a variation occurs at one of the $n$ measurement points it includes. As will be apparent from FIGURES 2 or 3, each measurement point for instance includes a resistor ($r_1$, $r_2$ ... $r_n$), the resistance variation of which is a linear function of the variation of a quantity to be measured and regulated: as an example, said quantity may be a temperature.

Instead of including a resistor, the measurement point could include a voltage source, any voltage variation of which is to be cancelled.

The regulator device of FIGURE 1 further includes $n$ control channels respectively comprising control units $K_1$, $K_2$ ... $K_n$ which are adapted for causing in known manner the regulated quantity to vary in a suitable way for cancelling the error signal.

The control system includes a single measurement bridge and amplifier arrangement and selector switching means for sequentially connecting the various measurement points to the said arrangement. According to an important feature of the invention, the regulator device further comprises gating means for transmitting the error signals to the respective control units, said gating means operating through coincidence of the said error signal with a triggering signal which is generated at regular time intervals by a timing generator C, sequentially on the $n$ outputs 1, 2 ... $n$ thereof, said triggering signal further controlling the operation of the selector switching means.

Three of the control channels have been illustrated in FIGURE 1. The control channel 1, connected at the output 1 of the timing generator C, which is for instance an electronic pulse counter, includes, connected in series, a first logical NOT circuit $N_1$, an AND circuit $E_1$, second and third NOT circuits $P_1$ and $Q_1$ respectively, and the control unit $K_1$. The latter for instance consists of a thyristor, the control electrode of which is connected to $Q_1$, and further connected, through a diode $S_1$, to the input of the AND gate $P_1$. Furthermore, the output of the AND gate $P_1$ is connected to the output of the NOT gate $N_n$, the output of the AND gate $P_2$ is connected to the output of the NOT gate $N_1$, etc.

In operation, the timing generator C successively applies pulses, to the respective outputs 1, 2 ... n and, as will be explained hereinafter, it results that the resistors $r_1$, $r_2$ ... $r_n$ (FIGS. 2 or 3) are successively connected to the bridge and amplifier arrangement and that, if any variation of one of the said resistors has occurred, an error signal is generated on output $S_M$ (FIG. 1).

The time when a triggering pulse is generated at output 2 of generator C will for instance be considered and the voltage level of the said pulse will be considered as the logical level "one." A pulse having a logical level "zero" will then appear at the output of the NOT gate $N_2$ and, therefore, at the input 2 of the measuring unit M. This has the effect of triggering the switching means so as to connect resistors $r_2$ to the bridge and amplifier arrangement. Should the resistor $r_2$ has suffered any variation with respect to its desired value, the said arrangement will then provide at output $S_M$ a "zero" level pulse. Therefore, both inputs of the AND gate $E_2$ receive a "zero" level pulse and it results that the gate delivers a "zero" level pulse at its output. Therefore, $P_2$ delivers a "one" level pulse at its output, while $Q_2$ delivers a "zero" level pulse. The said "zero" level pulse is adapted for triggering the thyristor $R_2$ into operation. At the end of the error pulse duration, the thyristor is maintained into operation through regeneration of the trigger pulse at the output of $Q_2$ via the feedback loop $S_2$, $P_2$, $Q_2$.

The conductive state of the thyristor, during which the thyristor will cause the regulated resistor $r_2$ to vary in a suitable way for cancelling the error signal, will be maintained during the whole "regulation cycle" in the course of which the resistors $r_3$, $r_4$ ... $r_n$ will be successively connected to the bridge and amplifier arrangement. The next regulation cycle will be started with the occurrence of a triggering pulse at output 1 of generator C. The said pulse will cause a zero level pulse to be generated at the output of gate $N_1$. The latter pulse in turn will be applied to the input of gate $Q_2$ and, therefore, a one level pulse will be generated at the output of $Q_2$, and will have the effect of triggering out thyristor $K_2$. The regulation cycle will continue with the occurrence of a triggering pulse at output 2 of generator C and then, the thyristor will again be triggered in the conductive state if the correction effected on resistor $r_2$ in the course of the preceding cycle was not sufficient for cancelling out the variation of the said resistor. Finally, the regulation process, on any of the channels, is continued during one or more cycles until the variation is completely cancelled out, and is automatically stopped as soon as it is no longer necessary, which is an interesting feature of the invention.

The operation of the regulation system as far as the various channels 1, 2 ... n are concerned is the same as that which has been hereinabove with respect to channel 2.

It is to be remarked that the timing generator C controls both the operation of the sequential switching of the various resistors $r_1$ ... $r_n$ and the sequential triggering of the control units $K_1$ ... $K_n$ by the various error signals, which makes the regulation system disclosed particularly simple in design and secure in operation.

In order that the design and operation of the measuring unit M may be more clearly understood, reference will now be made to the diagrams of FIGS. 2 or 3.

In both figures, a Wheatstone bridge is formed of resistors $R_1$, $R_2$ and $R_3$, having predetermined known values, and of resistors $r_1$, $r_2$ ... $r_n$ to be regulated. The timing generator C cooperates with switching means, which will be disclosed in detail hereinafter, for sequentially connecting the resistors $r_1$ ... $r_n$ across the outer diagonal of the bridge. Across the inner diagonal of the bridge is connected a differential amplifier A, at the output of which is connected the primary winding of a transformer T. Across the secondary winding of the transformer is connected a resistor R and two inversely poled diodes Z and Do, in series with a resistor $R_c$, are connected in parallel across resistor R, Z being a Zener diode.

It is to be understood that the amplifier and transformer arrangement which is connected across the inner diagonal of the Wheatstone bridge is of known type and could be modified without departing from the spirit and scope of the invention. Any unbalance of the bridge, due to a variation of that of the resistors $r_1$ ... $r_n$ which is then connected therein results, in known manner, in a sharp voltage rise at the output of the amplifier, which will provide a voltage pulse across the secondary winding of the transformer. The said pulse is transmitted across the terminals of resistor $R_c$ (i.e., at the output $S_M$ of the measuring unit) only when its amplitude is sufficiently large to overcome the threshold which is provided by the Zener diode: therefore, a voltage rise due to a drift which may occur within the amplifier will not be transmitted at the output $S_M$.

Referring more particularly now to FIG. 2, the switching means essentially include diodes $D_1$, $D_2$ ... $D_n$, connected in series with resistors $r_1$, $r_2$ ... $r_n$, and transistors $T_1$, $T_2$ ... $T_n$. Each of the transistors is connected between the junction point of the corresponding resistor and diode and lead O, which is grounded and connected at a first terminal of the outer diagonal of the bridge.

A negative voltage is applied to a lead U which is connected to the second terminal of the said outer diagonal.

The base electrodes of the transistors are connected to the respective outputs 1, 2 ... n of timing generator C.

A suitable biasing voltage, not illustrated, is permanently applied to the said base electrodes, so that the transistors normally are in the conductive state, only that of the transistors on the base of which a triggering pulse from generator C is applied being non-conductive during the said pulse.

As the emitter-collector resistance of the transistors is low as compared to the resistance of the circuit channels across which they are connected, an inversely poled voltage is applied by the conductive transistors, so as to prevent any flow of current through the corresponding diodes. Finally, only that of the resistors $r_1$ ... $r_n$ which corresponds to a nonconductive transistor will be effectively connected to the bridge, which will then measure any variation thereof.

In order that the voltage variation across the amplifier input terminals be constantly proportional to the variation of the resistors $r_1$ ... $r_n$, the diodes $D_1$ ... $D_n$ should operate in a substantially linear portion of their current voltage characteristic curve, which will be easily obtained through proper selection of the components characteristic figures, provided that the diodes $D_1$ ... $D_n$ be of the semiconductor type which is a feature of the present invention.

A further diode D will preferably be connected in series with resistor $R_3$, and will be selected in view of compensating for the resistance variation within diode $D_n$ which will occur as the operating temperature of the device is varying.

In the modified preferred form of embodiment which is illustrated in FIG. 3, the switching means are comprised of transistors $W_1$, $W_2$ ... $W_n$ which are connected in series with the respective resistors $r_1$, $r_2$ ... $r_n$. The transistors are normally non-conductive, only that transistor on the base electrode of which a pulse from the timing generator C is applied being conductive. It results that only the corresponding resistor $r_n$ is connected to the bridge.

A further transistor $W_0$, which will advantageously be of the pnp type of conductivity if the transistors $W_1$ ... $W_n$ are of the npn type, and vice-versa, is permanently maintained in the conductive state by means of a biasing voltage, not illustrated. The transistor $W_0$ performs the function of compensating for the effect of variations which may occur in the operating temperature of the device.

It will be emphasized that the transistors $W_1$ ... $W_n$ should have a substantially ohmic behaviour within the whole range of current intensities flowing therethrough.

According to a feature of the present invention, this is obtained through combining a reversal of the usual emitter and collector connections with such a selection of the values of the impedances in circuit that the transistors will operate with a current gain substantially equal to one and a base current which will remain substantially constant. This selection will readily be made by those skilled in the art, account being taken of the conditions which have just been stated.

It appears from FIG. 3 that the emitter electrode of the transistors $W_1 \ldots W_n$ (illustrated with an arrow) is mounted so as to perform the function of a collector, and vice-versa. This reversal of the emitter and collector connections has already been used in prior art, but, in the present invention, it provides the new and remarkable result of enabling one to obtain an operation of the transistors in a portion of their current-voltage characteristic curve which is substantially a straight line passing through the point $I_E$ (emitter current)=0 and $V_{CE}$ (emitter-collector voltage)=0. In the said portion of their characteristic curve, the transistors have therefore a substantially ohmic behaviour. Moreover, the leakage current therethrough will be very low and therefore, no substantial error will be introduced in the measurement.

The resistors $\rho_1, \rho_2 \ldots \rho_n$, which are connected in series with the respective resistors $r_1, r_2 \ldots r_n$, will be adjusted so as to compensate for the unavoidable differences in the characteristic figures of the respective transistors.

The transistors will advantageously be of silicon junction transistors of the planar type, for instance the transistor FW 4284 type SGS manufactured by Fairchild.

Figure 4:
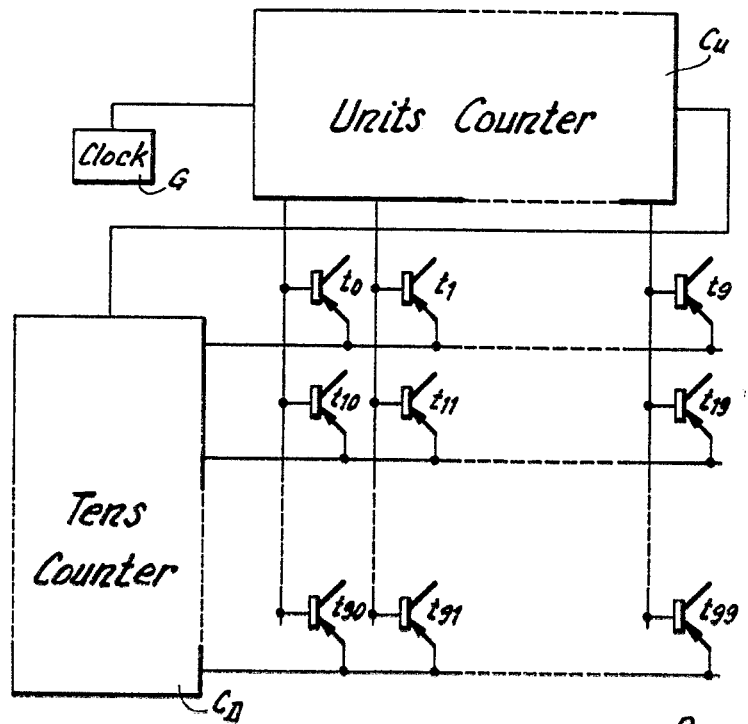
FIGURE 4 is a circuit arrangement which will advantageously be used as a clock generator in the regulator device and FIGURE 5 is a circuit diagram illustrating a form of gating arrangement which may be employed in the device of FIGURE 1.
Figure 5:
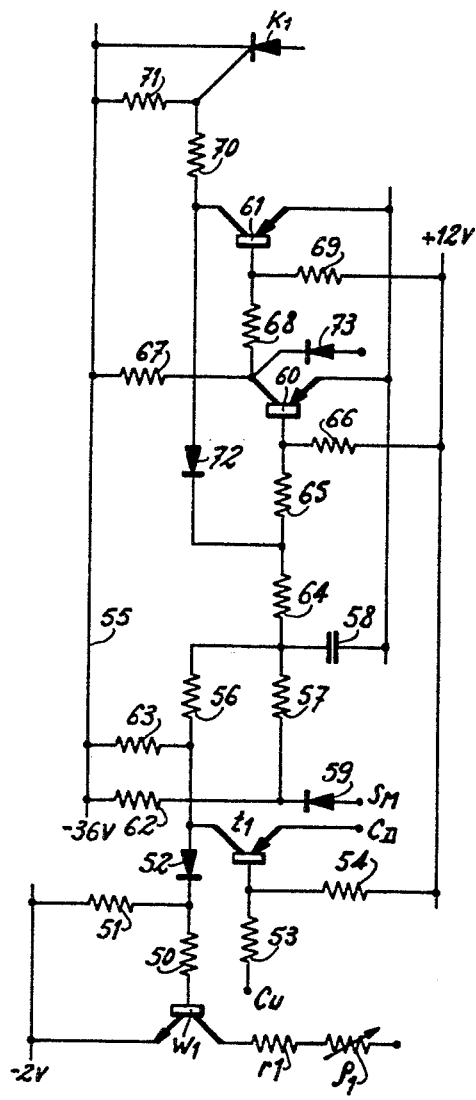

Referring more particularly now to FIGS. 4 and 5, an advantageous form of timing generator and control channel will be described in more detail.

The timing generator illustrated in FIG. 4 is adapted for the control of 100 channels. It is to be understood that this number of channels is given by way of example only.

The timing generator includes two electronic decade counters of known type, $C_U$ and $C_D$ respectively. Counter $C_U$ provides a negative going pulse of −36 volts (logical level "zero") successively on its outputs 0 to 9 which are respectively connected to the base electrodes of transistors $t_0, t_1 \ldots t_9$. Counter $C_D$ provides a pulse of 0 volt (logical level "one") successively on its outputs 0 to 9 which are respectively connected to the emitter electrodes of transistors $t_0$ to $t_9$, $t_{10}$ to $t_{19}, \ldots t_{90}$ to $t_{99}$.

The transistors $t_0, t_1 \ldots, t_9, t_{10} \ldots t_{99}$ are interconnected so as to form a matrix having ten lines respectively connected to the outputs of counter $C_D$ and ten columns respectively connected to the outputs of counter $C_U$. The counters are driven by a clock pulse generator G and interconnected in such a way that any number of pulses between 0 and 99 will be displayed on the matrix under the form of a level "one" voltage appearing on the collector electrode of one of the transistors. For instance, the number 19 will be displayed under the form of a level "one" voltage appearing on the collector of transistor $t_{19}$. It is to be understood that once a regulation cycle has been completed, i.e. the 100 channels have been scanned, another cycle is started by the appearance of a level zero voltage on the collector of transistor $t_0$. The arrangement of FIG. 4 enables to scan a large number of channels through the use of a comparatively small number of components; this being due to the use of the decoding transistor matrix illustrated.

Referring now to FIG. 5, the control channel 1 has been illustrated, with the transistor $t_1$, the base of which is connected to counter $C_U$ via a resistor 53 (not shown on FIG. 4), and the emitter of which is connected to counter $C_D$. Resistor 54 is a biasing resistor. The measuring unit is illustrated only by the transistor $W_1$, the collector of which is connected to resistors $r_1$ and $\rho_1$ (these reference numerals denoting the same components as in FIG. 3). The transistor $W_1$ is normally polarised in the non-conductive state by means of resistors 50–51, a diode 52 preventing any flow of current between lead 55 (which is connected to a source of −36 v.) and transistor $W_1$.

The control channel 1 further includes gates and a control unit which correspond to those which have been shown under block form in FIG. 1. the transistor $T_1$ plays the part of the NOT gate $N_1$. An AND gate, equivalent to $E_2$, is comprised of resistors 56, 57, and is connected to the output $S_M$ of the measuring unit through a diode 59. The NOT gates $D_1$ and $Q_1$ essentially consist of the transistors 60 and 61., respectively, whereas $K_1$ is a thyristor.

The arrangement further comprises resistors 62 to 71, diodes 72–73 and condenser 58, which introduces a small time delay in the cancellation of the potential which maintains transistor 60 in the conductive state, in view of providing sufficient time for applying thereto the potential at the collector of transistor 61, across diode 72.

The diode 73 connects the output of the NOT gate 60 to the output of transistor $t_{99}$ (not illustrated on FIG. 5), whereas the diode 72 connects the output of the NOT gate 61 to the input of the NOT gate 60, and is therefore the equivalent of diode $S_1$ of FIG. 1.

The operation of the device exactly conforms to that which has been discussed hereinabove with reference to FIG. 1. However, it is to be observed that the logical functions AND and NOT are obtained, in the said device, through the use of particularly simple means.

It is to be understood that the particular embodiments described herein are only exemplary and that various modifications in construction and arrangement are possible without departing from the spirit and scope of the invention.

What is claimed is:

1. A system for sequentially monitoring a plurality of variable quantities, said system comprising: a plurality of resistors variable as a function of said quantities; a Wheatstone bridge having an internal diagonal; selector switch means including a plurality of semiconductor switching units respectively in circuit with said resistors in parallel across one branch of the bridge; an amplifier and detector arrangement connected in said internal diagonal and having a single output; a plurality of control units each having an input; a plurality of AND gates each having first and second inputs and an output; a plurality of pairs each including first and second serially connected NOT gates, the said pairs being respectively connected between the outputs of the respective AND gates and the inputs of the respective control units; a plurality of feedback loops respectively connecting the inputs of the respective control units to the outputs of the respective AND gates; a timing generator including a plurality of further NOT gates having outputs respectively connected to the second inputs of the respective AND-gates and to the respective resistors, the said single output being connected to the first inputs of the AND gates, said timing generator being adapted to provide triggering signals sequentially on the respective outputs of said further NOT gates.

2. A multiple monitoring system as claimed in claim 1, wherein each of said semiconductor switching units includes a semiconductor diode connected in series with one of said variable resistors at a junction point, and a transistor connected in parallel across the first diagonal of the bridge, said transistor having an emitter connected to said junction point and a base, said timing generator having a plurality of outputs which are respectively connected to the respective bases of said transistors; and voltage supply means connected to the base of each of said transistors for normally biasing said transistors in the conductive state.

3. A multiple monitoring system as claimed in claim 1, wherein each of said semiconductor switching units includes a transistor connected in series with one of said variable resistors, said transistor having reversed emitter and collector electrodes and a base, said timing generator having a plurality of outputs which are respectively connected to the respective bases of said transistors, each said transistor being mounted so as to operate with a current gain substantially equal to one and a substantially constant base current.

4. A multiple monitoring system as claimed in claim 1, wherein said timing generator includes at least first and second interconnected pulse counters; a clock generator connected to said first counter, each of said counters having a plurality of outputs; a decoder matrix having a plurality of columns connected to the respective outputs of the first counter and a plurality of lines connected to the respective outputs of the second counter; a plurality of transistors each having a base connected to one of the said lines, and a collector, the collectors of the respective transistors forming the respective outputs of the timing generator.

5. A multiple monitoring system as claimed in claim 1, wherein each of said pairs of NOT-gates respectively consists of a first and a second transistors each having a base and a collector, the output of the AND-gate being connected to the base of the first transistor, the collector of the first transistor being connected to the base of the second transistor, the collector of the second transistor being connected to the control unit, the feedback loop including a diode which connects the collector of the second transistor to the base of the first transistor.

References Cited

UNITED STATES PATENTS

| | | | |
|---|---|---|---|
| 2,578,447 | 12/1951 | Odell | 340—413 |
| 3,402,404 | 9/1968 | Burley | 340—413 |

THOMAS B. HABECKER, Primary Examiner

U.S. Cl. X.R.

307—242; 340—166